W. F. PRATT.
Cotton Gin.
No. 25,307.  Patented Aug. 30, 1859.
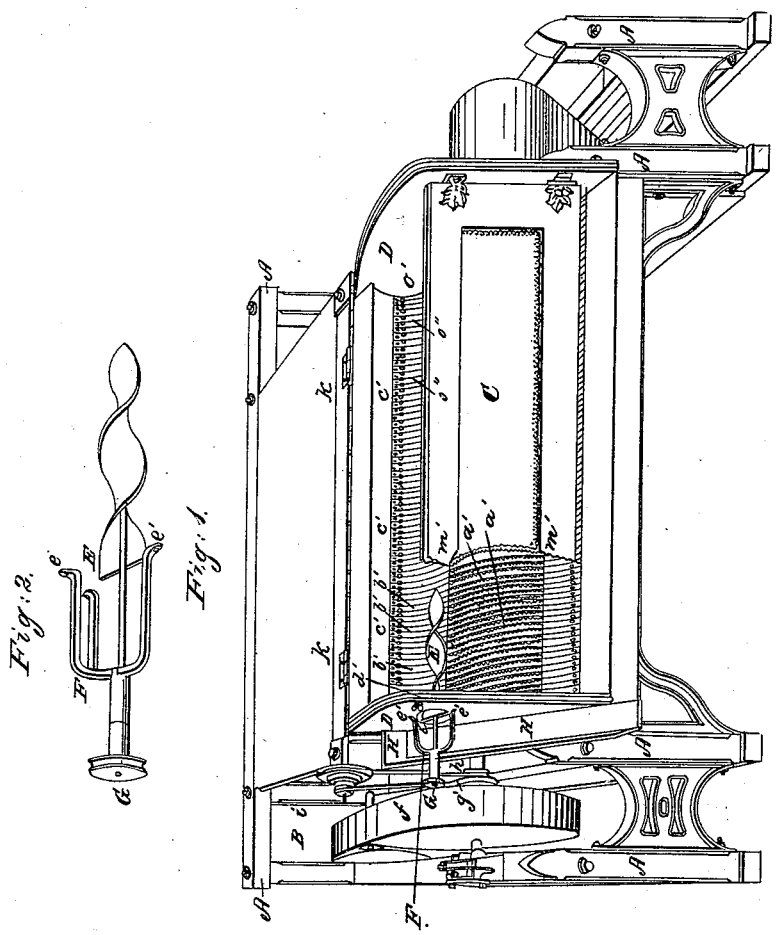
Witnesses:
Robt Curtis
H. H. White
Inventor:
Wm F. Pratt

UNITED STATES PATENT OFFICE.

WILLIAM F. PRATT, OF EAST BRIDGEWATER, MASSACHUSETTS, ASSIGNOR TO THE E. CARVER COMPANY, OF SAME PLACE.

IMPROVEMENT IN COTTON-GINS.

Specification forming part of Letters Patent No. 25,307, dated August 30, 1859.

*To all whom it may concern:*

Be it known that I, WILLIAM F. PRATT, of East Bridgewater, in the county of Plymouth and State of Massachusetts, have invented a new and useful Improvement in Saw-Gins for Ginning Cotton; and I do hereby declare the following to be a full and exact description thereof, reference being had to the accompanying drawings and the accompanying letters marked thereon, making part of this specification.

The nature and purpose of my invention consist in enabling the cotton-gin, during its operation, to carry and keep the roll of seed-cotton while in the roll-box in a lighter and more elastic condition than has heretofore been done, and at the same time and by the same process to remove from the roll the hulls, bolls, trash, and foreign substances without injuring the saw-teeth or cutting or mixing the hulls, &c., with the clean cotton in the lint-room; also, in enabling the gin to gin faster and with less power than has heretofore been done.

In the annexed drawings, Figure 1 represents a perspective of a common gin having my improvements attached; Fig. 2, a perspective view of the cleaning or boxing portion of my improvements.

The portions of the machine not having immediate reference to my improvement herein described may be constructed in the usual manner. These parts are principally comprised in the frame A, Fig. 1, the brush B, Fig. 1, (not seen in these drawings,) the saws $a'$ $a'$ $a'$, the grates $b'$ $b'$ $b'$, and the front or seed boards, C.

Like letters designate corresponding parts in both figures.

In operating the common gin the seed-cotton is put into the roll-box or hopper formed by the front or seed board, C, Fig. 1, the ends D D, Fig. 1, the curve $c'$ $c'$ $c'$, and the grates $b'$ $b'$ $b'$, and rests upon the saws $a'$ $a'$ $a'$. As the saws revolve, the cotton is taken off by them from the seeds and carried through between the grates, and discharged therefrom by the revolving brush into the lint-room behind the gin. As the saws revolve, the seed and unginned cotton likewise revolve, but in a different direction from the saws, and this operation so continues as long as the cotton is fed into the gin.

The following difficulties are found in the operation of the common gin: The hulls, bolls, seed, trash, and foreign substances are always naturally seeking the middle or longitudinal center of the roll, and there form a pith or core. This core at first is of small size, but constantly increases by accumulation in bulk, compactness, and weight, and after feeding the gin a short time this core nearly fills or occupies the space of the roll, and by its increased weight, compactness, and solidity then presses and holds down the hulls, bolls, seed, &c., of the fresh cotton, which is fed in on the outside of the roll while ginning, so hard upon the points of the saw-teeth that they are thereby cut up as they revolve and carried through between the grates into the lint-room, mixed with the ginned cotton, giving a rough and dirty sample, which process continues till the gin is stopped or the roll relieved. This pressure of roll down upon the saws in some gins is increased by the introduction of a solid or hollow cylinder—revolving or stationary, into the center of the roll, running quite through it from end to end of the roll-box. In all cases of this kind they operate to condense the roll while the cotton is passing between the under side of this cylinder and the saw-teeth, and add to the difficulty above stated, inasmuch as they produce a more unyielding pressure than would be caused by the simple weight of the roll alone, even though it were filled heavy with hulls, seed, &c., as above described. This heavy and compacted roll in all cases requires more power to turn it and drive the gin, and also reduces the speed of ginning. A greater number of revolutions to the brush and saw cylinder is attainable from the same application of power when the roll is kept light, uniform, compressible, and elastic, like the condition of the seed-cotton when the roll is first fed into the gin. The preservation of this condition is one of the objects of my improvement, by which I am enabled to allow the hulls, bolls, &c., to pass round on the surface of the roll with a greatly-diminished liability to their being cut to an injurious extent, even though in its first revolution they come in contact with the saws. When the roll is in this condition, it is not heavy enough and hard enough to offer sufficient weight and resistance to cause the teeth of the revolving saws to pierce and cut the hulls, bolls, &c., to anything like the extent to which they are thus acted on in machines operating on the opposite principle, and as a consequence of this the saws do not get so quickly or so badly dulled.

It is also understood by all cotton-ginners and persons acquainted with ginning that in feeding any gin with seed-cotton, if the ginner feed the gin entirely or chiefly at one end of the roll-box, the seeds, hulls, bolls, and foreign substances will at first seek the center of the roll at that point so fed, and thence pass endwise in a spiral or gyratory manner toward and quite up to the end of the roll opposite that into which it is fed, and collecting in a mass there will stop and clog the roll. So, also, if cotton be fed midway in the roll, the seed, hulls, bolls, &c., will in like manner pass both ways from the point of feeding to both ends of the roll and clog there. Likewise, if fed at both ends, they will pass and collect midway of the roll. Hence great care is required to feed the roll in the common gin evenly and uniformly from end to end, or else one end or the other, or some point in the roll, will become surcharged with seed, hulls, &c., clogging and stopping, and occasioning thereby a great loss of time and power, and injury to the quality of cotton.

To remedy these difficulties I construct my improved gin in any of the usual forms, but with the following modifications, constituting my improvements: In one end of the feed or roll box (if the gin be of the usual size—say from sixty to eighty saws) I make a hole, $d'$, Fig. 1, of a proper size—say four inches in diameter—the center of which should be nearly in the center of the ginning-roll of seed-cotton while turning. Through this hole, and in the center of it, I insert a revolving spiral clearer or auger, E, Figs. 1 and 2, which projects, say, twelve or fifteen inches from its bearing in the holding-bracket F, Figs. 1 and 2, and pierces the end of the roll in its center, say, twelve inches, more or less. This clearer is surrounded by no shield or covering, but is to come into direct contact with the cotton in the roll, and should not be made to afford any obstacle to the free rising up of the roll at any part of it where the cotton is fed in. The clearer I usually make of about two inches in diameter at the larger end, and slightly tapering toward its point. This clearer is held and turns freely in the standard-box F, Figs. 1 and 2, (which is attached to the outer end of the roll-box at E' E',) and is driven by a band, $f'$, Fig. 1, leading from a cone-pulley, $g'$, Fig. 1, on the saw-shaft $h'$, Fig. 1, to a corresponding cone counter-pulley, $i'$, and from that by another band leading over its own shank-pulley G, Figs. 1 and 2, so arranged and proportioned as to turn it in the same direction as that in which the ginning-roll revolves, and with greater rapidity. With some forms of the clearer its motion may be reversed, or it may have an endwise reciprocation combined with a rotary motion, with a fair result; but I think the direction and motion above described as adopted is best. The counter-pulley $i'$, Fig. 1, is hung on a center corresponding with the centers of the butts or hinges $k'$ $k'$, on which the grate-fall or roll-box moves when raised or lowered, and thus the clearer, band, and all may move with it without stretching or casting the band. This device, as well as the cone-pulleys, I describe as a common mechanical arrangement for moving the clearer, as above, and changing its speed when required to move faster or slower. At the end of the roll-box D, and below the hole therein, I attach a spout or conductor, H, Fig. 1, down which those seeds and impurities discharged through the hole by the clearer pass off to the seed-pile.

In the drawings, Fig. 1, the front or seed board, C, is represented as broken off at $m'$ $m'$, showing the clearer of about the proper length and in proper position. The clearer in no case should ever extend the full length of the roll-box. Its specific operation would be destroyed thereby.

In gins having a great number of saws I propose to use two clearers, if found necessary—one at each end of the roll—but in this case the gin must be fed at or near midway in the roll-box, as it is necessary in using this gin the greatest portion of seed-cotton should be fed into the roll-box at that point which is farthest removed from the point of the clearer, and the feeding gradually lighter up to the point where it terminates. In order to secure the proper operation of the improvements described, no seed-cotton should be fed into the roll-box over that part in which the roll is penetrated by the clearer, and in which it works.

In the process of ginning with my improved gin-stand, (reference being had to the drawings as annexed,) the ginner draws his seed-cotton into the roll-box near and at the end O'' O'', opposite the end where the clearer is attached. As the roll is filled at that end, the seed and impurities first seek the center of the roll, and as the ginner continues to feed in the fresh cotton this central mass seeks a freer space and passes out endwise from the seed-roll, assuming a spiral and gyratory movement in its passage till it reaches the opposite end of the roll-box, and accumulates there. The cotton being fed in meanwhile also works in that direction, but with a slower movement, and soon surrounds the seeds, &c., and filling the roll-box at that end with the seeds, &c., and itself envelops and incloses the clearer while it is in motion. The clearer, revolving at a more rapid rate and working in the center of the roll, which is composed of seed, hulls, &c., loosens up and extracts them from that end of the seed-roll and discharges them into the spout H, Fig. 1, constantly creating a hollow space at that point, which is constantly being filled up by the endwise spiral motion of the central seeds and hulls and impurities, which are constantly thus passing through the center of the ginning-roll without coming in contact with or cut by the teeth of the saws while the ginning-roll has been traversing its own natural endwise course. The size and motion and twist of the clearer is so arranged that this central mass is removed before its accumulation gives any objectionable weight, density, or compactness to the ginning-roll, and no part of the roll being pressed or held down by any internal cylinder or device, it is thus constantly left so light, so soft, and so elastic that it will yield freely to pressure, and be raised so easily that the points of the teeth cannot pierce the bark of the seed or hull or foreign substances found in the seed-cotton to the same objectionable degree that has heretofore been done. The length of the clearer is such that the seeds shall have sufficient time to be cleaned before they are extracted from the center of the ginning-roll, which would not be the case were it to extend through the center of the roll from one end of it to the other, or if the seed-cotton were fed into the roll uniformly—that is, as much at one end or point as at the other.

In this invention I do not claim the feeding the gin at one end of the roll-box as by itself; nor do I limit my claim to the particular form, size, length, or attachment of the clearer herein particularly set forth. Other forms and modes of attachments may be used, operating with more or less success, though substantially alike, such as a simple square shaft spirally twisted, or a round shaft with pins or fins or broad spirally-set floats, which I consider simply as equivalents, though more imperfect; or the motion may be communicated by gearing instead of banding; but I consider no form or mode so good as the one I propose and describe herein.

I am aware that in the patent of R. A. L. McCurdy, dated June 26, 1855, a spirally-winged shaft is employed which revolves within a screen for the purpose of removing the hulls, bolls, &c., from the interior of said screen. I do not claim any such arrangement; nor do I claim a screw or auger running entirely across the width of the gin, whether combined or not with a screening-cylinder; but

What I claim, and desire to secure by Letters Patent, is—

The use of a naked or unshielded auger or clearer operating in the end of the ginning-roll of a cotton-gin, at or near the center thereof, substantially in the manner and for the purpose described.

In testimony whereof I have hereunto subscribed my name, in presence of two subscribing witnesses, this 4th day of July, A. D. 1859.

WM. F. PRATT.

Witnesses:
ROBT. CURTIS,
H. W. WHITE.